United States Patent
Kim

(10) Patent No.: US 7,035,664 B2
(45) Date of Patent: Apr. 25, 2006

(54) METHOD OF OPERATION FOR A MOBILE COMMUNICATION TERMINAL CAPABLE OF PROVIDING A HIGH-SPEED DATA RATE SERVICE

(75) Inventor: Kyung-Wook Kim, Taegukwangyok-shi (KR)

(73) Assignee: Samsung Electronics Co., Ltd., (KR)

( * ) Notice: Subject to any disclaimer, the term of this patent is extended or adjusted under 35 U.S.C. 154(b) by 538 days.

(21) Appl. No.: 10/271,254

(22) Filed: Oct. 15, 2002

(65) Prior Publication Data
US 2003/0087680 A1    May 8, 2003

(30) Foreign Application Priority Data
Oct. 29, 2001  (KR)  ............... P2001-66886

(51) Int. Cl.
*H04B 1/38* (2006.01)

(52) U.S. Cl. ............... 455/553.1; 455/101; 455/132; 455/343.1; 455/574

(58) Field of Classification Search ............ 455/553.1, 455/101, 103, 132–140, 572, 574, 343.1
See application file for complete search history.

(56) References Cited

U.S. PATENT DOCUMENTS

| | | | | |
|---|---|---|---|---|
| 6,665,284 B1 * | 12/2003 | Tran et al. | ............... | 370/334 |
| 2003/0083097 A1 * | 5/2003 | Kim | ............... | 455/553 |
| 2003/0104796 A1 * | 6/2003 | Yoon | ............... | 455/277.2 |

* cited by examiner

Primary Examiner—Lee Nguyen
(74) Attorney, Agent, or Firm—Dilworth & Barrese LLP

(57) ABSTRACT

A method for controlling an operation of a mobile communication terminal for providing a high-speed data rate (HDR) service. The mobile communication terminal comprises first and second antennas, a first radio frequency (RF) module connected to the first antenna and having an RF transmitter and an RF receiver, and a second RF module connected to the second antenna and having a dedicated RF receiver If a current mode of the mobile communication terminal is a traffic mode for providing the HDR service, battery power is supplied to both the first and second RF modules and signal processing associated with the first and second RF modules is performed. If the current mode of the mobile communication terminal is not the traffic mode for providing the HDR service, a supply of the battery power is blocked to the second RF module and the signal processing associated with the first RF module is performed. Rates of high-speed data received through the first and second antennas are periodically checked while the mobile communication terminal is in the traffic mode. If a current one of the high-speed data rates is higher than a predetermined threshold value, the supply of the battery power is blocked to the second RF module and the signal process associated with the first RF module is performed.

3 Claims, 2 Drawing Sheets

METHOD OF OPERATION FOR A MOBILE COMMUNICATION TERMINAL CAPABLE OF PROVIDING A HIGH-SPEED DATA RATE SERVICE

PRIORITY

This application claims priority to an application entitled "METHOD FOR CONTROLLING OPERATION OF MOBILE COMMUNICATION TERMINAL CAPABLE OF PROVIDING HIGH-SPEED DATA RATES SERVICE", filed in the Korean Industrial Property Office on Oct. 29, 2001 and assigned Ser. No. 2001-66886, the contents of which are hereby incorporated by reference.

BACKGROUND OF THE INVENTION

1. Field of the Invention

The present invention relates generally to a mobile communication terminal, and more particularly to a method for controlling an operation of a mobile communication terminal capable of providing a high-speed data rate service.

2. Description of the Related Art

Recently, mobile communication companies are preparing for a high-speed data rate (HDR) service that improves the quality of high-speed wireless Internet service while being connected with code division multiple access (CDMA) 2000-1x. This is accomplished in that the HDR service does not support a separate voice service, and instead has an excellent data transfer capability as to surpass existing high speed wired Internet services.

The HDR service is provided for the commercial availability of a CDMA2000-1x evolution data only (EVDO) service, which is considered a very high speed wireless data communication service based on a 2-generation network, and is considered to be a synchronous international mobile telecommunication (IMT)-2000 (3rd generation: 3G) technique because it has a transfer rate which is ten times or more as high as that of a CDMA 2000-1x (IS95C) service, called a 2.5-generation service. The HDR service is also appropriate to a high-speed wireless Internet service in that it provides a maximum forward data rate of 2.4 Mbps and a maximum reverse data rate of 153.6 Kbps by assigning a data dedicated channel. Further, the HDR service may be used to enhance a data transfer capability in an existing CDMA 2000-1x (IS95C) network or an independent data network. In the existing CDMA network, selected voice channels are changed into data channels. However, the HDR service employs the combination of time division multiplexing (TDM) and CDMA to allow several users to share each channel with one another. Also, the HDR service does not have a time band fixed as in time division multiple access (TDMA), but uses the time band only as needed. Data rates of the HDR service for the optimum connection with Internet protocol (IP) packets over the Internet will be different according to distances from mobile communication terminals to a base station.

As a result, a mobile communication terminal supporting the EVDO service can provide services and transmit and receive moving images in real time, at a data rate of 2 Mbps or more surpassing that of the very high speed wired Internet service. This mobile communication terminal uses a space diversity technology employing two antennas and has two radio frequency receivers, thereby minimizing loss of received information resulting from fading.

However, such a mobile communication terminal has a disadvantage in that a larger amount of battery power is consumed since two antennas and two radio frequency receivers are used together. Further, a larger amount of load is applied to hardware and software for various controls associated with the two radio frequency receivers.

SUMMARY OF THE INVENTION

Therefore, the present invention has been designed in view of the above problem, and it is an object of the present invention to provide a method for controlling the operation of a mobile communication terminal capable of providing a high-speed data rate service, which reduces the amount of battery power consumption.

It is another object of the present invention to provide a method for controlling the operation of a mobile communication terminal capable of providing a high-speed data rate service, which reduces battery power consumption and a load on hardware and software for various controls associated with two radio frequency receivers.

In accordance with the present invention, the above and other objects are accomplished by a method for controlling the operation of a mobile communication terminal capable of providing a high-speed data rate service, the mobile communication terminal including a first antenna and a second antenna, a first radio frequency module connected to the first antenna and having a radio frequency transmitter and a radio frequency receiver, and a second radio frequency module connected to the second antenna and having a dedicated radio frequency receiver, the method comprising the steps of: a) determining whether a current mode of the mobile communication terminal is a traffic mode for the high-speed data rate service; b), if the current mode of the mobile communication terminal is the traffic mode for the high-speed data rate service, supplying battery power to both the first and the second radio frequency modules and performing signal processing associated with the first and the second radio frequency modules; c), if the current mode of the mobile communication terminal is not the traffic mode for the high-speed data rate service, blocking the supply of the battery power to the second radio frequency module and performing the signal processing associated with the first radio frequency module; d) periodically checking rates of high-speed data received through the first antenna and the second antenna while the mobile communication terminal is in the traffic mode for the high-speed data rate service; and e), if a current one of the high-speed data rates is higher than a predetermined threshold value, blocking the supply of the battery power to the second radio frequency module and performing the signal processing associated with the first radio frequency module.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
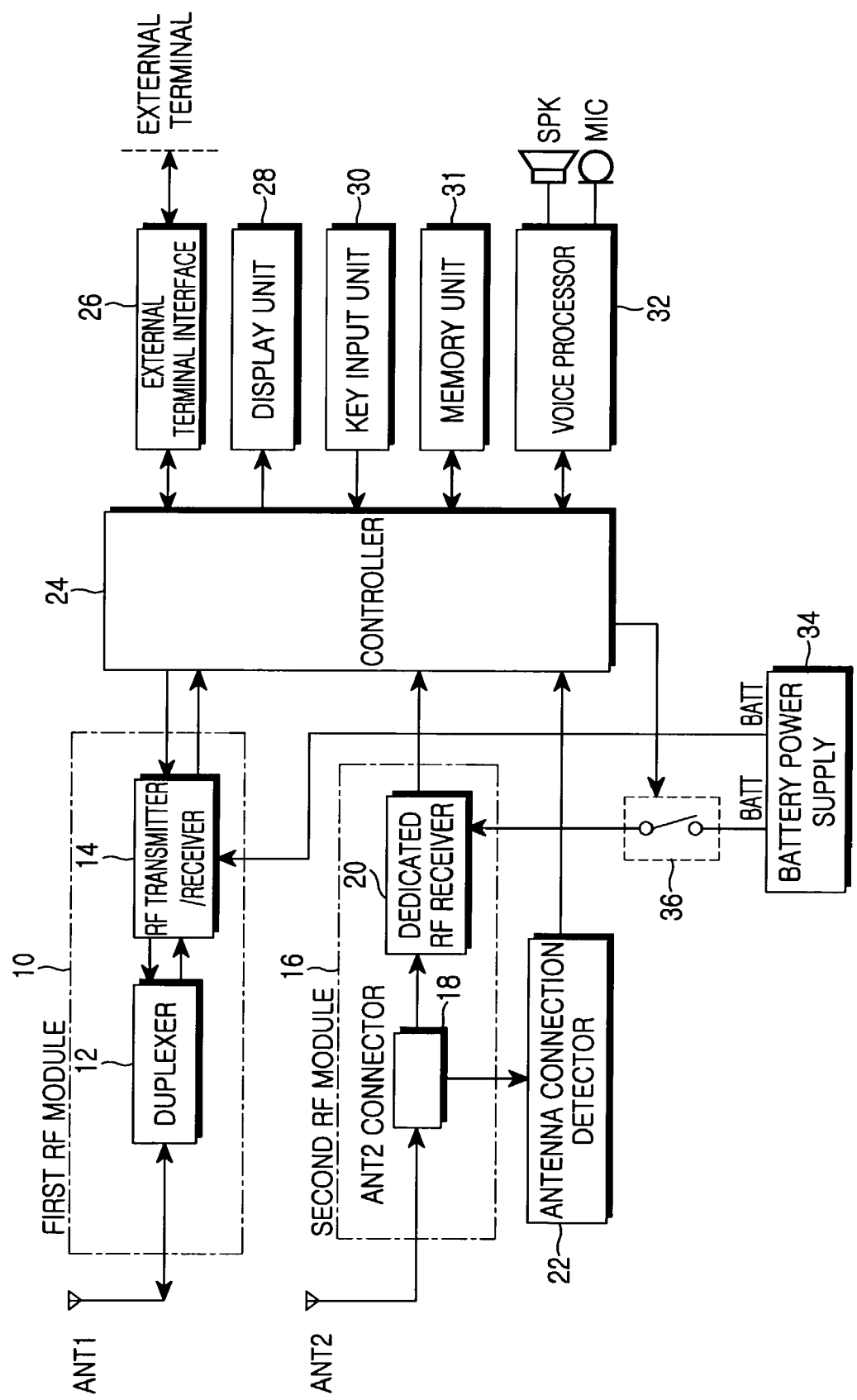
FIG. 1 is a block diagram illustrating the construction of a mobile communication terminal in accordance with a preferred embodiment of the present invention.

Preferred embodiments of the present invention will be described in detail herein below with reference to the annexed drawings. In the drawings, same or similar elements are denoted by same reference numerals even though they are depicted in different drawings. In the following description, a detailed description of known functions and configurations incorporated herein will be omitted when it may make the subject matter of the present invention rather unclear.

Referring to FIG. 1, a construction of a mobile communication terminal in accordance with a preferred embodiment of the present invention is illustrated, which includes two antennas employing space diversity technology and two radio frequency (RF) receivers to provide a high-speed data rate (HDR) service. As illustrated in FIG. 1, the mobile communication terminal comprises two antennas ANT1 and ANT2. The first antenna ANT1 is mounted to the body of the mobile communication terminal. Preferably, the first antenna ANT1 is a non-directional retractable antenna enabling two-way communication with the terminal and convenient carrying of the terminal. The second antenna ANT2 is detachably mounted to the body of the mobile communication terminal. This second antenna ANT2 is used along with the first antenna ANT1 to provide an HDR service to minimize loss of received information resulting from signal fading. In this regard, the second antenna ANT2 must be prevented from protruding out of the top of the terminal body. To this end, the second antenna ANT2 preferably has a planar antenna structure such as a planar inverted F antenna (PIFA) structure, a chip antenna structure of a surface mounted device (SMD) type, an antenna structure using a transmission line for connection with an external terminal, an antenna structure using an earphone, or an antenna structure using an accessory, such as string, for decorative or anti-theft purposes. Recently, mobile communication terminals have become smaller and lighter, resulting in restrictions in terminal size and design, and difficulties in positioning the second antenna ANT2. In consideration of these restrictions and difficulties, the second antenna ANT2 is preferably configured to be detached from the terminal body when the HDR service is not provided.

The present mobile communication terminal illustrated in FIG. 1 further comprises a first RF module 10 including a duplexer 12 connected to the first antenna ANT1, and an RF transmitter/receiver unit 14. The first RF module 10 transmits and receives low-speed and high-speed data (circuit data and packet data) as well as voice data under the control of a controller 24. The mobile communication terminal further comprises a second RF module 16 including an antenna connector 18 connected to the second antenna ANT2, and a dedicated RF receiver 20. The second RF module 16 receives low-speed and high-speed data (circuit data and packet data) as well as voice data applied through the second antenna ANT2 under the control of the controller 24.

The antenna connector 18 in the second RF module 16 connects the second antenna ANT2 to the dedicated RF receiver 20 in response to the mounting or connection of the second antenna ANT2 by a user. An antenna connection detector 22 is further provided in the mobile communication terminal to detect the connection of the second antenna ANT2 to the dedicated RF receiver 20 and apply the resulting antenna connection detection signal to the controller 24.

The controller 24 controls the entire operation of the mobile communication terminal. In accordance with the preferred embodiment of the present invention, particularly, the controller 24 controls a switch 36 to supply or block battery power BATT from a battery power supply 34 to the dedicated RF receiver 20 in the second RF module 16 according to whether the second antenna ANT2 is connected to the dedicated RF receiver 20 to provide the HDR service, whether an external terminal is connected to the mobile communication terminal to provide the HDR service, or whether the mobile communication terminal is in a traffic mode to provide the HDR service.

The battery power supply 34 supplies the battery power BATT to the dedicated RF receiver 20 in the second RF module 16 via the switch 36. The battery power supply 34 and supplies the battery power BATT to the RF transmitter/receiver unit 14 in the first RF module 10 directly via no switch. Although the battery power BATT from the battery power supply 34 is illustrated in FIG. 1 to be supplied to only the RF transmitter/receiver unit 14 in the first RF module 10 and the dedicated RF receiver 20 in the second RF module 16, for a better understanding of description of the present invention, those skilled in the art will appreciate that the battery power BATT is also supplied to any circuits in the mobile communication terminal other than the RF transmitter/receiver unit 14 and dedicated RF receiver 20.

An external terminal interface 26 is also provided in the mobile communication terminal to perform an interfacing operation with an external terminal such as a personal computer. The external terminal interface 26 preferably supports a universal asynchronous receiver/transmitter (UART) protocol, a universal serial bus (USB) protocol, an infrared data association (IrDA) protocol, a bluetooth protocol, etc. A display unit 28 displays various messages under the control of the controller 24. A key input unit 30 outputs key input data corresponding to a key pushed by the user to the controller 24. To this end, the key input unit 30 has a plurality of numeral keys and a plurality of function keys. A memory unit 31 includes a data memory for storing program data for control of the mobile communication terminal operation and data generated during the control operation of the controller 24 or an operation desired by the user. A voice processor 32 is operated by the controller 24 to receive voice data from the first RF module 10, convert the received voice data into an audio signal, and output the converted audio signal through a speaker SPK. The voice processor 32 also receives an audio signal from a microphone MIC, converts the received audio signal into voice data, and outputs the converted voice data to the first RF module 10.

In the preferred embodiment of the present invention, when the mobile communication terminal is in a traffic mode when providing the HDR service, two reception paths are used together to accurately receive high-speed data. In brief, the controller 24 supplies the battery power BATT to both the first RF module 10 and second RF module 16, and performs signal processing associated with the first RF Module 10 and the second RF module 16. As a result, a reception rate of high-speed data can be raised using space diversity technology employing the two antennas ANT1 and ANT2. On the other hand, when the mobile communication terminal is not in the traffic mode, namely, when the mobile communication terminal is in a sleep mode, an idle mode, a traffic mode for voice call connection, or a traffic mode for providing a low-speed data rate service, the battery power BATT from the battery power supply 34 is not applied to the second RF module 16. As a result, the battery power BATT is applied to only the first RF module 10. Consequently, the mobile communication terminal reduces the load on software by the amount of load on a signal process associated with the second RF module 16 and the battery power consumption by the amount of battery power to be supplied to the second RF module 16, respectively.

Further, in the preferred embodiment of the present invention, even when the mobile communication terminal is in the traffic mode for the HDR service where the two reception paths are used together, only one of those paths is controlled to be used in a field environment where it is possible to provide the HDR service using only one reception path. In this case, the battery power BATT from the battery power supply 34 is not applied to the second RF module 16. As a result, the battery power BATT is applied to only the first RF module 10. Consequently, even in the traffic mode for the HDR service, the mobile communication terminal reduces the load on software by the amount of load on a signal process associated with the second RF module 16 and the amount of battery power consumption by the amount of battery power to be supplied to the second RF module 16, respectively.

Figure 2:
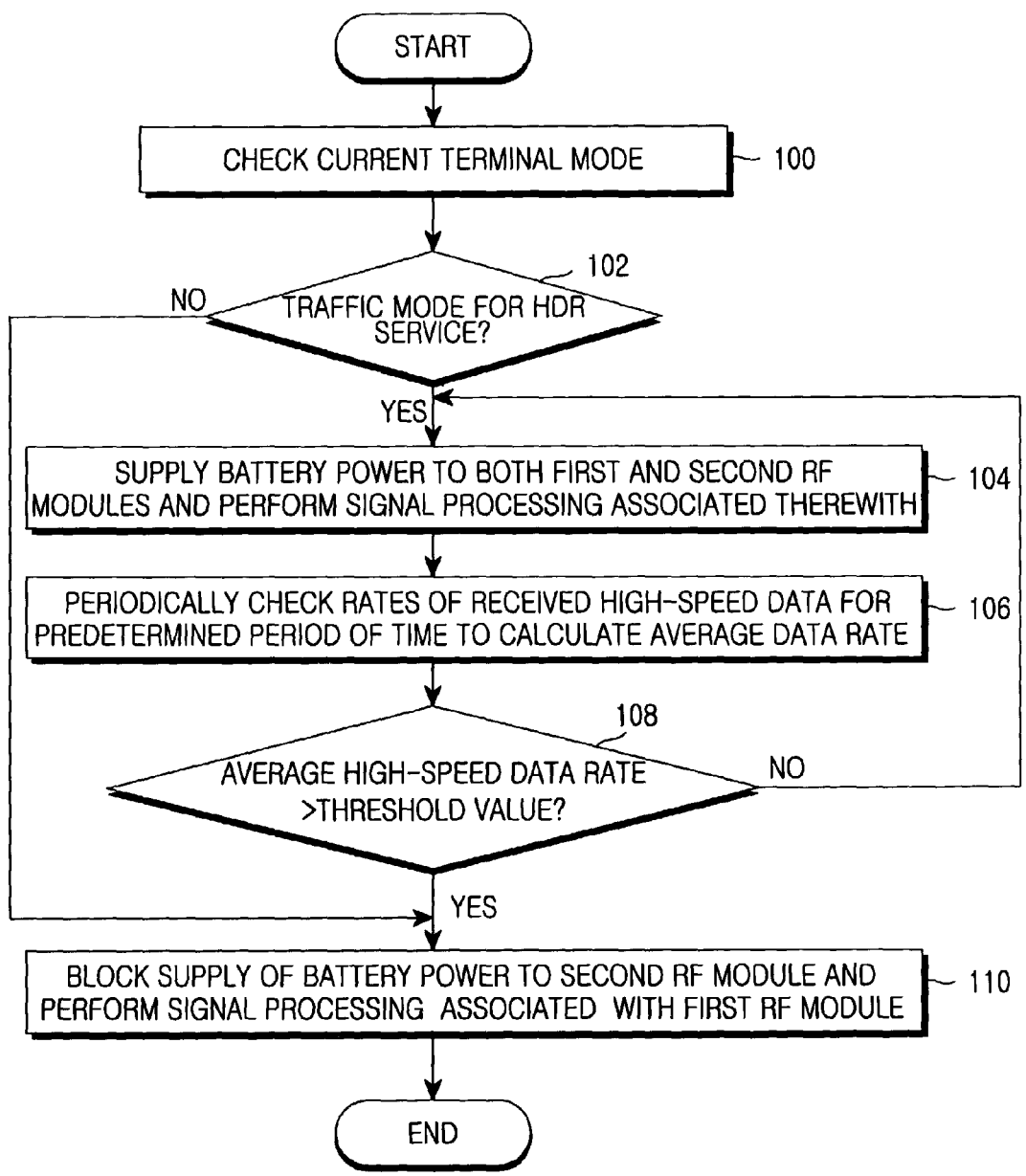
FIG. 2 is a flow chart illustrating a control operation of the mobile communication terminal in accordance with the preferred embodiment of the present invention.

FIG. 2 is a flow chart illustrating a control operation of the mobile communication terminal in accordance with the preferred embodiment of the present invention. A detailed description will be given hereinafter of the control operation of the mobile communication terminal in accordance with the preferred embodiment of the present invention with reference to FIGS. 1 and 2.

First, the controller 24 checks the current mode of the mobile communication terminal in step 100 of FIG. 2. The mobile communication terminal capable of providing the HDR service generally has a sleep mode, an idle mode, a traffic mode for voice call connection, or a traffic mode for provision of a low-speed data rate service (for example, data rate: 14.4 Kbps, 64 Kbps, 154 Kbps or etc.), and a traffic mode to provide the HDR service (data rate: maximum forward data rate of 2.4 Mbps and maximum reverse data rate of 153.6 Kbps).

After performing step 100, the controller 24 proceeds to step 102 to determine whether the current mode of the terminal is the traffic mode for the HDR service. The current terminal mode is set according to a protocol between the mobile communication terminal and a base station, and is recognized by each of the mobile communication terminal and base station. If the current terminal mode is determined to be the traffic mode for the HDR service in step 102, the controller 24 proceeds to step 104 to supply the battery power BATT from the battery power supply 34 to both the first RF module 10 and the second RF modules 16, and performs signal processing associated with the first RF module 10 and the second RF module 16.

However, if it is determined in step 102 that the current mode of the terminal is not the traffic mode for the HDR service, namely, it is the sleep mode, the idle mode, the traffic mode for the voice call connection, or the traffic mode for the low-speed data rate service, the controller 24 proceeds to step 110 to turn off the switch 36 such that the battery power BATT from the battery power supply 34 is not applied to the dedicated RF receiver 20 in the second RF module 16, and to perform only signal processing associated with the first RF module 10. As a result, when the current terminal mode is not the traffic mode for the HDR service, the battery power BATT is not supplied to the second RF module 16 and is supplied only to the first RF module 10. Therefore, the mobile communication terminal reduces the load on software of the controller 24 by the amount of load on a signal process associated with the second RF module 16 and the battery power consumption by the amount of battery power to be supplied to the second RF module 16, respectively.

Meanwhile, after performing step 104, the controller 24 moves to step 106 to periodically check rates of received high-speed data for a predetermined period of time to calculate an average data rate of the received high-speed data in the predetermined time period. Namely, while the mobile communication terminal is in the traffic mode for the HDR service, the controller 24 periodically checks rates of received high-speed data for the predetermined time period and calculates an average data rate of the received high-speed data in the predetermined time period. The reason is that an actual data rate for the HDR service is different depending on field environments including a distance from the mobile communication terminal to a base station, etc.

Thereafter, the controller 24 proceeds to step 108 to determine whether the calculated average high-speed data rate is higher than a predetermined threshold value. This threshold value is a value, preferably within the range of 1 Mbps to 2 Mbps, for determination as to whether the current field environment is a field environment where it is possible to provide the HDR service using only one reception path even in the traffic mode for the HDR service.

Upon determining at step 108 that the calculated average high-speed data rate is higher than the predetermined threshold value, the controller 24 proceeds to step 110 to turn off the switch 36 such that the battery power BATT from the battery power supply 34 is not applied to the dedicated RF receiver 20 in the second RF module 16, and to perform only signal processing associated with the first RF module 10.

Table 1 below shows whether the battery power BATT from the battery power supply 34 is supplied to the first RF module 10 and the second RF module 16, and whether signal processing associated with the first RF module 10 and the second RF module 16 are performed, according to the preferred embodiment of the present invention.

TABLE 1

| MODE | ANT1, FIRST RF PRESENT, CONVENTIONAL | ANT2, SECOND RF PRESENT | ANT2, SECOND RF CONVENTIONAL |
|---|---|---|---|
| SLEEP MODE | X | X | X |
| IDLE MODE | ○ | X | ○ |
| TRAFFIC MODE | | | |
| VOICE DATA | ○ | X | ○ |
| LOW-SPEED DATA | ○ | X | ○ |

TABLE 1-continued

| MODE | | ANT1, FIRST RF PRESENT, CONVENTIONAL | ANT2, SECOND RF PRESENT | ANT2, SECOND RF CONVENTIONAL |
|---|---|---|---|---|
| HIGH-SPEED DATA (HDR SERVICE) | CURRENT DATA RATE ≦1–2 Mbps | O | O | O |
| | CURRENT DATA RATE >1–2 Mbps | O | X | O |

As seen above in table 1, according to the preferred embodiment of the present invention, battery power consumption of the mobile communication terminal providing the HDR service can be suppressed at the maximum while loss of received information thereof can be minimized.

As apparent from the above description, the present invention provides a method for controlling the operation of a mobile communication terminal capable of providing an HDR service, which performs control operations associated with two radio frequency modules according to the current mode of the terminal and a data rate for the HDR service, thereby reducing battery power consumption and the load on hardware and software for various controls associated with two radio frequency receivers.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A method for controlling an operation of a mobile communication terminal for providing a high-speed data rate service, said mobile communication terminal including a first antenna and a second antenna, a first radio frequency module connected to said first antenna and having a radio frequency transmitter and a radio frequency receiver, and a second radio frequency module connected to said second antenna and having a dedicated radio frequency receiver, said method comprising the steps of:
   a) determining whether a current mode of said mobile communication terminal is a traffic mode for providing the high-speed data rate service;
   b) if the current mode of said mobile communication terminal is said traffic mode for providing the high-speed data rate service, supplying battery power to both said first and second radio frequency modules and performing signal processing associated with said first and second radio frequency modules;
   c) if the current mode of said mobile communication terminal is not said traffic mode for providing the high-speed data rate service, blocking a supply of said battery power to said second radio frequency module and performing said signal processing associated with said first radio frequency module;
   d) periodically checking rates of high-speed data received through said first and second antennas while said mobile communication terminal is in said traffic mode for providing the high-speed data rates service; and
   e) if a current one of said high-speed data rates is higher than a predetermined threshold value, blocking the supply of said battery power to said second radio frequency module and performing said signal processing associated with said first radio frequency module.

2. A method for controlling an operation of a mobile communication terminal for providing a high-speed data rate service, said mobile communication terminal including a first antenna and a second antenna, a first radio frequency module connected to said first antenna and having a radio frequency transmitter and a radio frequency receiver, and a second radio frequency module connected to said second antenna and having a dedicated radio frequency receiver, said method comprising the steps of:
   a) determining whether a current mode of said mobile communication terminal is a traffic mode for providing the high-speed data rate service;
   b) if the current mode of said mobile communication terminal is said traffic mode for providing the high-speed data rate service, supplying battery power to both said first and second radio frequency modules and performing signal processing associated with said first and second radio frequency modules;
   c) if the current mode of said mobile communication terminal is not said traffic mode for providing the high-speed data rate service, blocking a supply of said battery power to said second radio frequency module and performing said signal processing associated with said first radio frequency module;
   d) while said mobile communication terminal is in said traffic mode for providing the high-speed data rate service, periodically checking rates of high-speed data received through said first and second antennas for a predetermined period of time to calculate an average data rate of the received high-speed data in the predetermined time period; and
   e) if the calculated average high-speed data rate is higher than a predetermined threshold value, blocking the supply of said battery power to said second radio frequency module and performing said signal processing associated with said first radio frequency module.

3. A method for controlling an operation of a mobile communication terminal for providing a high-speed data rate service, said mobile communication terminal including a first antenna and a second antenna, a first radio frequency module connected to said first antenna and having a radio frequency transmitter and a radio frequency receiver, and a second radio frequency module connected to said second antenna and having a dedicated radio frequency receiver, said method comprising the steps of:
   a) checking a current mode of said mobile communication terminal and a high-speed data rate in a traffic mode for providing the high-speed data rate service;

b) comparing the high-speed data rate in the traffic mode for providing the high-speed data rate service with a predetermined threshold; and c) controlling a power supply from a battery to said first and second radio frequency modules and signal processing associated with said first and second radio frequency modules in accordance with the checked results and the results of the comparison.

* * * * *